(12) United States Patent
Trevethan

(10) Patent No.: US 12,086,798 B2
(45) Date of Patent: Sep. 10, 2024

(54) COMPUTER-IMPLEMENTED SYSTEM AND METHOD SUITABLE FOR INCREASING THE SECURITY OF INSTANT OFF-LINE BLOCKCHAIN TRANSACTIONS

(71) Applicant: nChain Licensing AG, Zug (CH)

(72) Inventor: Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 879 days.

(21) Appl. No.: 17/047,318

(22) PCT Filed: Mar. 25, 2019

(86) PCT No.: PCT/IB2019/052398
§ 371 (c)(1),
(2) Date: Oct. 13, 2020

(87) PCT Pub. No.: WO2019/197926
PCT Pub. Date: Oct. 17, 2019

(65) Prior Publication Data
US 2021/0150522 A1    May 20, 2021

(30) Foreign Application Priority Data
Apr. 13, 2018 (GB) .................... 1806112

(51) Int. Cl.
*G06Q 20/38* (2012.01)
*G06Q 40/04* (2012.01)
(Continued)

(52) U.S. Cl.
CPC ... *G06Q 20/3829* (2013.01); *G06Q 20/38215* (2013.01); *G06Q 20/3825* (2013.01);
(Continued)

(58) Field of Classification Search
CPC ......... G06Q 20/3829; G06Q 20/38215; G06Q 20/3825; G06Q 40/04; G06Q 20/204;
(Continued)

(56) References Cited

U.S. PATENT DOCUMENTS 6,243,466 B1 * 6/2001 Young ............... H04L 9/0894
380/28
6,282,295 B1 * 8/2001 Young ............... H04L 9/3013
380/30
(Continued)

FOREIGN PATENT DOCUMENTS

CN     102045709 A *  5/2011
CN     104009837 A *  8/2014
(Continued)

OTHER PUBLICATIONS

Don Johnson, The Elliptic Curve Digital Signature Algorithm (ECDSA), Certicom Corporation (Year: 2001).*
(Continued)

*Primary Examiner* — Neha Patel
*Assistant Examiner* — Chunling Ding
(74) *Attorney, Agent, or Firm* — Davis Wright Tremaine LLP

(57) ABSTRACT

This specification describes a system and method that enables bitcoin signed transactions to be accepted as a payment for goods and services instantly and off-line, without the need to wait for confirmation that the transaction is included in a valid block, or even for confirmation that a transaction has been received by the network. Building on the concept of a one-time signature implemented within bitcoin script, this method involves a payer providing the payee with a special compensation key at the point-of-sale which can be used to claim a time-locked deposit output when combined with a 'revealed' private key, if (and only if)

(Continued)

a double-spend is perpetrated by the payee. The validity of this compensation key is guaranteed via a novel type of zero-knowledge-proof, which is highly efficient: the proof can be generated in ~5 milliseconds and can be verified in −30 milliseconds. The use of this system in a retail setting would allow vendors to accept instant cryptocurrency payments off-line for high value items without aggregated risk of loss, and without the need to trust a third party service.

18 Claims, 5 Drawing Sheets

(51) Int. Cl.
| | |
|---|---|
| H04L 9/08 | (2006.01) |
| H04L 9/30 | (2006.01) |
| H04L 9/32 | (2006.01) |
| G06Q 20/20 | (2012.01) |
| G06Q 20/32 | (2012.01) |
| G06Q 20/36 | (2012.01) |
| H04L 9/00 | (2022.01) |

(52) U.S. Cl.
CPC ........... *G06Q 40/04* (2013.01); *H04L 9/0825* (2013.01); *H04L 9/3066* (2013.01); *H04L 9/3218* (2013.01); *H04L 9/3247* (2013.01); *G06Q 20/204* (2013.01); *G06Q 20/326* (2020.05); *G06Q 20/367* (2013.01); *G06Q 2220/00* (2013.01); *H04L 9/0869* (2013.01); *H04L 9/3252* (2013.01); *H04L 9/50* (2022.05); *H04L 2209/56* (2013.01)

(58) Field of Classification Search
CPC ............... G06Q 20/326; G06Q 20/367; G06Q 2220/00; G06Q 20/065; G06Q 20/105; G06Q 20/3678; H04L 9/0825; H04L 9/3066; H04L 9/3218; H04L 9/3247; H04L 9/0869; H04L 9/3252; H04L 9/50; H04L 2209/56

See application file for complete search history.

(56) References Cited

U.S. PATENT DOCUMENTS

| | | | |
|---|---|---|---|
| 6,389,136 B1* | 5/2002 | Young | H04L 9/302 |
| | | | 713/180 |
| 6,678,665 B1 | 1/2004 | Benson et al. | |
| 9,819,487 B2* | 11/2017 | Fujii | H04L 9/3073 |
| 10,257,176 B2* | 4/2019 | Parviainen-Jalanko | |
| | | | H04W 12/0431 |
| 11,140,171 B1* | 10/2021 | Friedman | H04L 9/0861 |
| 11,310,060 B1* | 4/2022 | Poelstra | H04L 9/3066 |
| 2006/0117181 A1* | 6/2006 | Brickell | H04L 9/3271 |
| | | | 713/176 |
| 2014/0344579 A1* | 11/2014 | Struik | H04L 9/30 |
| | | | 713/171 |
| 2015/0363768 A1 | 12/2015 | Melika et al. | |
| 2016/0373257 A1* | 12/2016 | Adrangi | H04L 9/006 |
| 2017/0061396 A1* | 3/2017 | Melika | G06Q 20/3829 |
| 2017/0195123 A1* | 7/2017 | Oberheide | H04L 9/14 |
| 2020/0287712 A1* | 9/2020 | Macchetti | H04L 9/003 |

FOREIGN PATENT DOCUMENTS

| | | | | |
|---|---|---|---|---|
| EP | 2326041 A1 * | 5/2011 | | G06F 7/723 |
| KR | 20180017734 A * | 2/2018 | | |

OTHER PUBLICATIONS

Andreas Antonopoulos, Mastering Bitcoin, O'Reilly Media Inc., Dec. 2014 (Year: 2014).*
Don Johnson, The Elliptic Curve Digital Signature Algorithm (ECDSA), 2001, Certicom Corporation (Year: 2001).*
Andreas Antonopoulos, Mastering Bitcoin, Dec. 2014, O'Reilly Media Inc. (Year: 2014).*
Antonopoulos, "Mastering Bitcoin—Unlocking Digital Cryptocurrencies," O'Reilly Media, Inc., Dec. 20, 2014, 282 pages.
Awemany, "Solving the 0-conf Problem Using Forfeits," https://gist.github.com/awemany/619a5722d129dec25abf5de211d971bd, 2018, 7 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion mailed Jul. 22, 2019, Patent Application No. PCT/IB2019/052398, 10 pages.
McCorry, "Application of the Blockchain Using Cryptography," PhD Dissertation, Newcastle University, Feb. 2018, 114 pages.
Nakamoto, "Bitcoin: A Peer-to-Peer Electronic Cash System," Bitcoin, Oct. 31, 2008, https://bitcoin.org/bitcoin.pdf, 9 pages.
Ruffing et al., "Liar, Liar, Coins on Fire!," Proceedings of the 22nd ACM SIGSAC Conference on Computer and Communications Security, Oct. 2015, 12 pages.
Satoshi et al., "Connection Limits," Bitcoin Forum, Aug. 9, 2010, https://bitcointalk.org/index.php?topic=741.0; prev_next=prev, 2 pages.
UK Commercial Search Report mailed Nov. 21, 2018, Patent Application No. GB1806112.7, 5 pages.
UK IPO Search Report mailed Oct. 5, 2018, Patent Application No. GB1806112.7, 5 pages.
Yu et al., "Fair Deposits Against Double-Speinding for Bitcoin Transactions," Research Collection School of Information Systems, Singapore Management University, Aug. 2017, 9 pages.

* cited by examiner

| | | | |
|---|---|---|---|
| Version number | | | |
| Number of inputs | | | 1 |
| Input 1 | Previous transaction | Hash | Funding UTXO |
| | | Output index | |
| | Signature script (P2PKH) | | \<Customer signature\> \<Customer public key\> |
| | Sequence number | | |
| Number of outputs | | | 2 |
| Output 1 | Value | | 5 |
| | Public key script | | OP_DUP \<PKS\><br>OP_CHECKSIGVERIFY<br>OP_SIZE \<0x4\><br>OP_EQUALVERIFY \<sigmask\><br>OP_AND \<r\><br>OP_EQUAL |
| Output 2 | Value | | 0 |
| | Public key script | | \<T\> OP_CHECKLOCKTIMEVERIFY<br>OP_DROP<br>\<PKD\><br>OP_CHECKSIG |
| Locktime | | | |

Structure of transaction Tx0

Fig. 5

COMPUTER-IMPLEMENTED SYSTEM AND METHOD SUITABLE FOR INCREASING THE SECURITY OF INSTANT OFF-LINE BLOCKCHAIN TRANSACTIONS

FIELD OF INVENTION

This specification relates generally to computer-implemented methods and systems suitable for implementation of a cryptographic protocol. The cryptographic protocol enables one party to derive a valid private key when a second private key is revealed. One application of such a cryptographic protocol is for increasing the security of instant off-line transactions using a blockchain network. The invention is particularly suited, but not limited, to use with the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts, if execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

SUMMARY OF INVENTION

According to a first aspect of the invention as described herein there is provided a computer-implemented method for a prover to implement a cryptographic protocol, the computer-implemented method comprising:
  generating a first cryptographic key pair comprising a first public key ($PK_1$) and a first private key ($sk_1$);
  generating a second cryptographic key pair comprising a second public key ($PK_2$) and a second private key ($sk_2$);
  constructing a compensation key (ck) from the first and second private keys ($sk_1$; $sk_2$), the compensation key (ck) enabling the second private key ($sk_2$) to be computed in the event that the first private key ($sk_1$) is revealed;
  constructing a cryptographic proof that the compensation key (ck) enables the second private key ($sk_2$) to be computed in the event that the first private key ($sk_1$) is revealed, the cryptographic proof not requiring the first and second private keys ($sk_1$; $sk_2$) to be revealed; and
  sending the first and second public keys ($PK_1$; $PK_2$), the compensation key (ck), and the cryptographic proof to a verifier in order for the verifier to authenticate the cryptographic proof that the compensation key (ck) enables the second private key ($sk_1$) to be computed in the event that the first private key ($sk_1$) is revealed.

According to a second aspect of the invention as described herein there is provided a computer-implemented method for a verifier to implement a cryptographic protocol, the computer-implemented method comprising:
  receiving, from a prover, the first and second public keys ($PK_1$; $PK_2$), the compensation key (ck), and the cryptographic proof constructed using the computer-implemented method according to the first aspect; and
  checking that the cryptographic proof validates the compensation key (ck) such that the second private key ($sk_2$) can be computed in the event that the first private key ($sk_1$) revealed;
  whereby, if information revealing the first private key ($sk_1$) is disclosed, the verifier: calculates the second private key ($sk_2$) from the first private key ($sk_1$) and the compensation key (ck); and
  utilizes the second private key ($sk_2$) to access cryptographic assets associated with the second public key ($PK_2$).

Cryptographic assets associated with the second public key ($PK_2$) can be time-locked for a lock-time T whereby the cryptographic assets can only be accessed after the lock-time T expires. Furthermore, the cryptographic proof can be a non-interactive zero knowledge proof. Such a non-interactive zero knowledge proof can be based on a zero-knowledge sigma ($\Sigma$) protocol converted to a non-interactive zero knowledge proof through application of a Fiat-Shamir heuristic.

The compensation key can be calculated by:

$$ck = sk_2 \cdot sk_1^{-1} \bmod n$$

where ck is the compensation key, $sk_1$ is the first secret key, $sk_2$ is the second secret key, and n is an order of a generator point G used to generate the first and second public keys from the first and second private keys, generation of the first and second public keys including an elliptic curve point multiplication of the elliptic curve generator point G.

The cryptographic proof can be constructed by:
generating secure random number r;
computing a commitment $R = r \times G$, $R_x$, being an x-coordinate of the point R;
computing a hash $H(R_x)$, set x being the left-most $l_n$ bits of H(R) where $l_n$ is the bit length of n;
computing $z = sk_1 x + r$;
where the cryptographic proof is a tuple $\pi = (ck, R, x, z)$.

The verifier can then authenticate the tuple as follows:
compute $$C = ck \times G$$

verify that:

$$x = \text{left-most of } l_n H(R_x)$$

$$z \times G = x \times PK_1 + R$$

$$z \times C = x \times PK_2 + ck \times R$$

if confirmed, then accept the value ck as valid.

One application of the cryptographic methodology as described above is for increasing the security of instant off-line transactions using a blockchain network. In such an application, the prover:

constructs a funding transaction comprising: a spend output associated with the first public key ($PK_1$) and the first private key ($sk_1$); and a deposit output associated with the second public key ($PK_2$) and the second private key ($sk_2$), the deposit output being time-locked for a lock-time T;
broadcasts the funding transaction to a blockchain network for incorporation in the blockchain;
constructs a purchase transaction to transfer funds from the spend output of the funding transaction to a payment address of the verifier over the blockchain network, the purchase transaction being signed using the first private key ($sk_1$) and
sends the purchase transaction, the first and second public keys ($PK_1$; $PK_2$), the compensation key (ck), and the cryptographic proof to the verifier.

In such an application, the verifier:
receives, from the prover, the purchase transaction, the first and second public keys ($PK_1$; $PK_2$), the compensation key (ck), and the cryptographic proof;
checks that the purchase transaction correctly specifies the funds to be transferred from the spend output associated with the first public key ($PK_1$) to the payment address;
checks that the deposit output associated with the second public key ($PK_2$) contains a required deposit amount;
checks that the cryptographic proof validates the compensation key (ck) such that the second private key ($sk_2$) can be computed in the event that the first private key ($sk_1$) is revealed: and
authorizes the purchase transaction and broadcasts the purchase transaction to blockchain network,
whereby if a second competing purchase transaction is broadcast to the blockchain network to spend funds from the spend output of the funding transaction prior to the lock-time T expiring, then the verifier;
calculates the first private key ($sk_1$) from signatures of the purchase transaction and second purchase transaction;
calculates the second private key ($sk_2$) from the first private key ($sk_1$) and the compensation key (ck);
constructs a transaction to transfer funds from the deposit output of the funding transaction to an address on the blockchain;
signs the transaction with the second private key $sk_1$); and
broadcasts the transaction to the blockchain network such that the funds in the deposit output of the funding transaction can be obtained by the vendor after the lock-time T expires.

The spend output can be configured such that to transfer funds from the spend output requires a transaction signature based on a fixed ephemeral key (k). The spend output can be a fixed-r-pay-to-public-key (FR-P2PK) output such that to transfer funds from the spend output requires a transaction signature utilizing a pre-specified r value. Furthermore, the deposit output can be larger than the spend output to increase the security of the system.

Embodiments of the present invention can be provided in a variety of forms. For example, a computer readable storage medium can be provided which comprises computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. A node of a blockchain network can also be provided, the node configured to perform the method as described herein.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which:

FIG. 5 shows an example of the form of the set-up transaction $Tx_0$.

DETAILED DESCRIPTION

Figure 1:
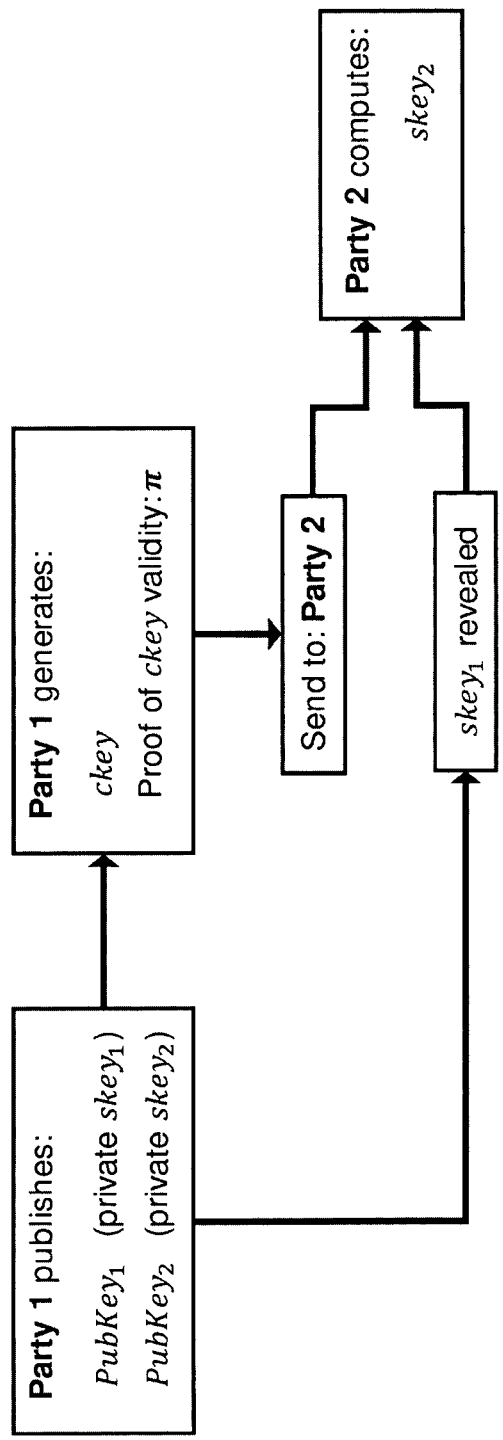
FIG. 1 shows a high-level schematic of a technical protocol as described herein.
Figure 2:
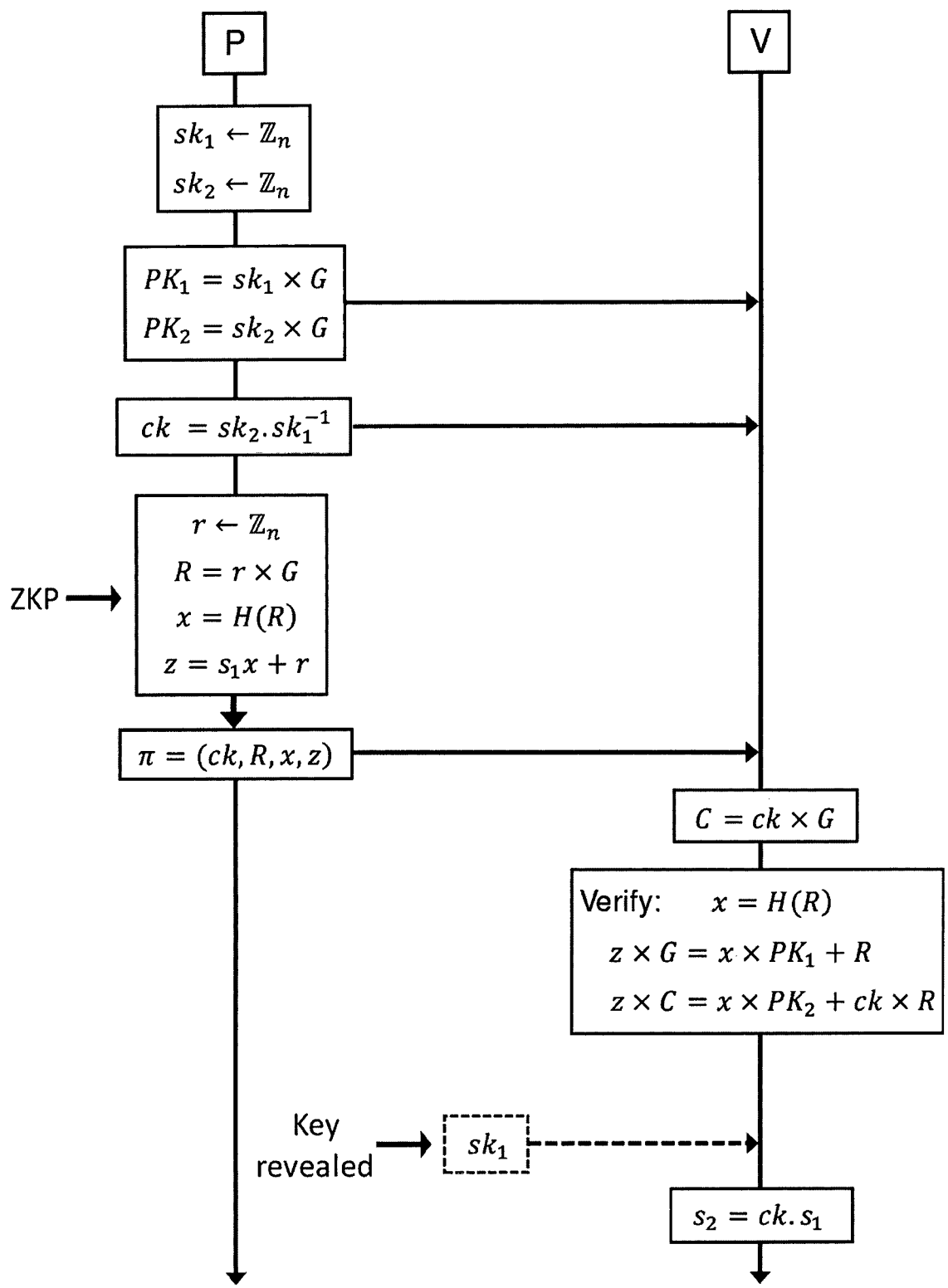
FIG. 2 shows the flow of operations and communications between a prove (P) and a verifier (V)
Figure 3:
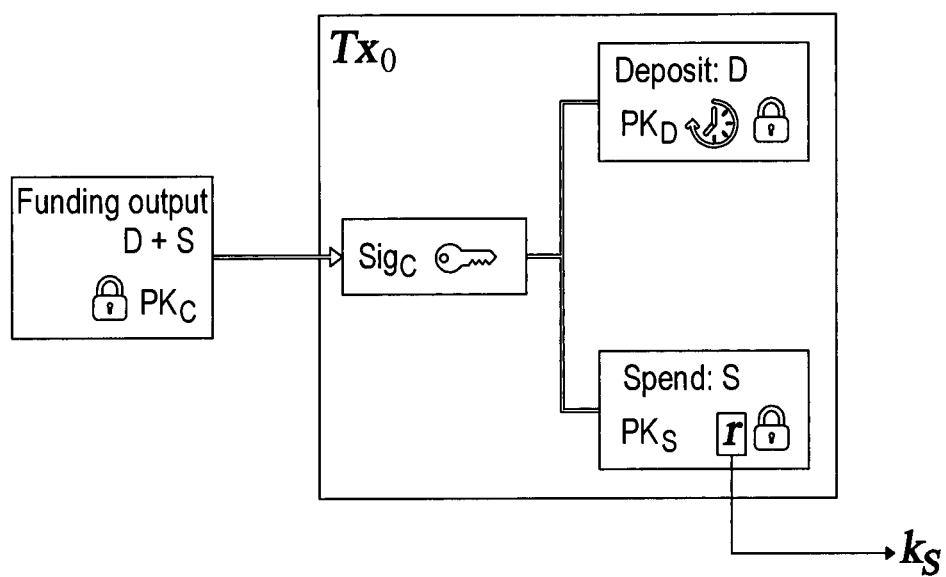
FIG. 3 shows a schematic of a set-up transaction.

This specification describes a system and method that enables bitcoin signed transactions to be accepted as a payment for goods and services instantly and off-line, without the need to wait for confirmation that the transaction is included in a valid block, or even for confirmation that a transaction has been received by the network. Building on the concept of a one-time signature implemented within bitcoin script, this method involves a payer providing the payee with a special compensation key at the point-of-sale which can be used to claim a time-locked deposit output when combined with a 'revealed' private key, if (and only if) a double-spend is perpetrated by the payee. The validity of this compensation key is guaranteed via a novel type of zero-knowledge-proof, which is highly efficient: the proof can be generated in ~5 milliseconds and can be verified in 30 milliseconds. The use of this system in a retail selling would allow vendors to accept instant cryptocurrency payments off-line for high value items without aggregated risk of loss, and without the need to trust a third party service.

The invention of Bitcoin provided the first completely decentralised solution to the problem of double-spending a digital token, by adding valid transactions to an append only immutable ledger that is replicated on every node in the network: the blockchain. However, in order to be appended to this ledger, a transaction must be confirmed within a block, and have sufficient proof-of-work (via block depth) added to it to be considered irreversible. This system has proven to be highly secure and reliable, however it takes a significant amount of time: a new block is mined in the Bitcoin network only every 10 minutes (on average) and there is no guarantee that a particular transaction will be included in the next block (especially if there is high demand and a limited block size). This slow confirmation time prevents the secure use of Bitcoin in many applications, particularly in a retail setting and at point-of-sale (POS), where in order to compete with cash and credit/debit card payments, secure transactions should be completed in a matter of seconds or less. It may be noted that the specification for contactless card payments states they must be completed and confirmed in less than 500 milliseconds.

Transactions which are valid (i.e. correctly formed and having valid signatures for unspent transaction outputs-UTXOs) and broadcast to the Bitcoin network but yet to be included in a block are known as zero-confirmation transactions (ZCT). A retailer may choose to accept a ZCT as payment for goods/services, but in doing so they must accept a risk that the funds may be double-spent: i.e. that a separate valid transaction spending the same UTXO is confirmed in the blockchain first. This would invalidate the retailer's transaction and they would lose the corresponding funds. This is known as a double-spending attack (or race attack) and would be perpetrated by a customer, who is then effectively stealing the goods/services they receive in the point-of-sale exchange.

The ultimate aim of this attack is to get the double-spend (attack) transaction confirmed (mined) first, before the transaction paying to the retailer. When a valid transaction is broadcast to the Bitcoin network it is added into to the mempool of individual mining nodes (the list of unconfirmed transactions that a miner can choose from to include in a new block). Mining nodes are free to include or exclude any valid transactions they wish, but since they follow economic incentives, transactions are usually prioritized based on the fee they offer. Therefore, an attacker can incentivise a miner to prioritise a transaction by paying a higher fee, even if a conflicting transaction was received first. This takes place automatically, with the Replace-By-Fee (RBF) feature in the Bitcoin Core client. This is discussed in more detail in a later section of this specification.

The lack of security in accepting zero-confirmation transactions is a substantial hindrance to Bitcoin's use as a payment system and to its adoption in the wider economy. Some retailers accept ZCTs for low value purchases, absorbing the costs of double-spend attacks into their business model, but this is severely limiting, and they must be on-line to confirm the propagation of the transaction throughout the network (which typically takes 5-10 seconds). Several other technical solutions have also been proposed and implemented that employ multisignature transactions and require trusting third parties (such as GreenAddress Bitpay Instant). The Lightning Network requires pre-funded payment channels linking the customer and the retailer via intermediate payment hubs: this payment routing is an unsolved technical problem, but both the payer and payee must be on-line and it is likely to take at least 5-10 seconds to negotiate a funded route through the network and confirm a payment (if it works at all).

An alternative approach that doesn't require funded payment channels, or trusted third parties, is described in a recent paper [Pérez-Solà2017]. This aims to dis-incentivise a double-spend attack by causing the private key controlling an output to be revealed if two different valid (signed) transactions are produced spending the same output: i.e. an attacker risks losing all of the funds in an output to anybody who observes both transactions (and who can then determine the private key). This is achieved by forcing a payer (customer) commit in advance to the ephemeral signing key (the r-value), converting the standard Bitcoin signature (ECDSA) into a 'one-time signature'. This approach, however, has significant shortcomings: firstly, due to the nature of the Bitcoin network and the way transactions are propagated, it can be difficult for both conflicting transactions to be observed by all network participants, before one of them is mined into a block (at which point it is too late). Secondly, there is no recompense for the retailer who has been defrauded: the party who manages to claim the double-spend-attempt output could be anyone observing the network, but is most likely a miner (see later section for more details). Thirdly, this method is of no use if the retailer is off-line and cannot transmit a signed transaction to the network (and also confirm that it has been propagated to all nodes).

In this specification we present a method that overcomes these shortcomings and enables a retailer (and only the retailer) to access compensation in the case that a double-spend attack is performed by a customer—even if the attacking transaction is confirmed first. This involves the customer placing a deposit in a time-locked output linked to a parallel one-time-signature output, and the customer providing the retailer with a compensation key that can be used to unlock the deposit when combined with the one-time-signature key. The validity of the compensation key is enforced with a new type of zero-knowledge proof: this is embodied in a novel protocol, which is highly efficient and requires only a few elliptic curve operations.

Elliptic Curve Digital Signature Algorithm

In the Bitcoin system (and other similar cryptocurrencies), unspent transaction outputs (UTXOs) are secured with the elliptic curve digital signature algorithm (ECDSA). Transaction outputs typically pay to an address (which is a hash of a public key) and can be 'spent' (unlocked) by a transaction input that provides the corresponding public key and a valid signature (which authorises the transaction and can only be generated using the corresponding private key).

The public key P (which is an elliptic curve point) is derived from the private key d via point multiplication (denoted with symbol ×) on the secp256k1 elliptic curve (with generator point G of order n):

$$P = d \times G$$

This is the elliptic curve specification used in Bitcoin. All protocols described in this specification are compatible with any other blockchain system, and not limited to the Bitcoin system.

The signature of a message in (e.g. the Bitcoin transaction) is generated as follows:
1. Calculate z=H(m) where H is the SHA-256 hash function.
2. Generate a secure random integer $k \leftarrow \mathbb{Z}_n$. This is the so-called ephemeral key.
3. Compute the point K=k×G
4. Compute r=$K_x$ mod n (where $K_x$ is the x-coordinate of the point K)
5. Computes=$k^{-1}$(z+rd) mod n
6. The signature is the pair of values (r,s)

The verification of the signature against the message m and public key P is performed as follows:
1. Compute z=H(m)
2. Compute w=$s^{-1}$ mod n
3. Compute $u_1$=zw mod n and $u_2$=rw mod n
4. Compute the point Y=$u_1$×G+$u_2$×P
5. The signature is valid if $Y_x$≡r (mod n)

A valid signature proves that the private key (d) was used to authorise a message, without revealing any information about the key. As described below, this is true only if the value k is also kept secret, and that different signatures use different random values of k.

One-Time-Signature

The ECDSA signature scheme has a well-known vulnerability (that is also shared with most other popular schemes such as DSA, Schnorr and ElGamal) where two different signatures (of two different messages, but using the same private key) can be used to derive the private key if the same ephemeral key (k) is used for both signatures.

Given two ECDSA signatures ($sig_1$=($r_1,s_1$) and $sig_2$=($r_2,s_2$)) of two different messages (i.e. the hashes: $z_1$ and $z_2$) computed with the same (unknown) ephemeral key k, anyone who observes $sig_1$ and $sig_2$ and also knows $z_1$ and $z_2$ can calculate the private key, as follows:
1. As the r value is computed directly from k, it will be the same for both signatures (i.e. r=$r_1$=$r_2$).
2. From the ECDSA definition: $ks_1$+mod n and $ks_2$=($z_2$+rd) mod n
3. The ephemeral key can then be determined as:

$$k = \frac{m_2 - m_1}{s_2 - s_1}$$

4. The private key can then be determined as:

$$d = \frac{s_1 k - m_1}{r}$$

This vulnerability has been exploited in several high profile hacks, where ECDSA implementation bugs have failed to generate a new secure k value for each new signature. However, it also leads to a potentially useful feature: By 'forcing' a signer to use a particular (but secret) k (and hence r) value for a signature, they can only ever sign one message with a particular private key, or they risk revealing the key. This is then a so-called one-time-signature: the private key can only ever be used to sign a single message.

It has been suggested that this property could be used to help prevent, or at least dis-incentivise, the double-spending of unconfirmed bitcoin transactions [Pérez-Solà 2017]. The basic idea is that a customer provides a vendor with a signed transaction that pays the purchase price of an item/service from a valid UTXO (and that pays the remainder of the UTXO as change back to the customer). If the customer then creates an attack transaction (paying all of the UTXO back to themselves) and broadcasts it, the two separate signatures will reveal the private key controlling the UTXO to anyone who observes both transactions. The double-spending customer then risks losing the entirety of the funds in the UTXO to a third party.

In order for this disincentive mechanism to work, the customer must use the same ephemeral key (k) to generate both signatures. This can be enforced by getting the customer to commit to the r-value of the signature in advance (r depends only on k) by creating a special type of transaction output: the so-called Fixed-r Pay-to-Public-Key (described below). The customer must set this up in advance: they must choose a k value (and securely store it, along with their private key) and pay sufficient funds into an output that requires a signature with an r value corresponding to the committed k.

Fixed-r Pay-to-Public-Key-Hash

The Fixed-r Pay-to-Public-Key (FR-P2PK) type transaction output [Pérez-Solà 2017] can only be unlocked with a signature that has a specific r-value which is committed to when creating the transaction. The process of (the customer) creating this funding transaction proceeds as follows:
1. The customer chooses as random ephemeral key k and private key d.
2. The customer computes their public key P=d×G
3. The customer computes r=$(k \times G)_x$ mod n
4. The customer creates a transaction, funded by outputs they control, with the following output (ScriptPubKey):

ScriptPubKey (This basic format can be also used in a P2PK-Hash or pay-to-script hash (P2SH) transaction):
OP_DUP <pubKey> OP_CHECKSIGVERIFY OP_SIZE <0x47>
OP_EQUALVERIFY <sigmask> OP_AND <r>OP_EQUAL where: <sigmask> is a 71-byte array (the same size as the signature) that has 1s in the positions where the r value is located in the signature array (and in the sighash-type flag position where the sighash-type flag is also constrained to SIGHASH_ALL (0x01) to ensure that different signatures are formed for different transaction spending outputs) and 0s in all other positions. <r> is a 71-byte array that only contains the r value in the position corresponding to the signature array and 0s in all other positions (and 0x01 in the sighash-type position).

5. The customer then broadcasts this funding transaction to the network and waits for confirmation in the blockchain, in advance of needing to perform a zero-confirmation transaction at a POS.

To spend this output, the customer must produce a signature that uses the same r value committed to in the funding transaction. To produce the signature, the customer must then know the corresponding k value and private key d.

Producing (and broadcasting) a second signature (on a different transaction) will then reveal the private key.

Problem

The rationale presented in [Pérez-Solà 2017] is that by requiring a customer to spend a FR-P2PK output to make an instant purchase, they risk losing the entirety of that output if they attempt a double spend (by broadcasting a second signed transaction). If the FR-P2PK output amount equals the value of the purchase (i.e. there is no 'change' output paid back to the customer) then the customer stands to lose nothing by attempting a double-spend attack. Therefore, the retailer may require that the FR-P2PK output contains significantly more than the purchase amount, so that the customer risks losing their 'change' output (which may be greater than the purchase amount) if they attempt the double spend. In this case, the customer now has an incentive to not attempt the double spend—but what is the likelihood of them being penalised, and who would benefit?

The dynamics of a double spending attack in this context depends on the way that mining nodes deal with (i.e. prioritise and/or relay) conflicting transactions, which is independent of the network consensus rules and depends only on the client implementation that the miner is running. The client may operate on a 'first seen' rule—that is the first valid transaction they receive is added to the mempool and subsequent transactions referring to the same outputs are simply ignored. In this case, during a double-spend attack different miners may have different transactions in their mempool depending on the way the two conflicting transactions are propagated around the network. But all miners monitoring the network can still get the private key from the broadcast conflicting transaction and create their own transaction to be included in a block—they are incentivised to do so.

A different client rule (which is implemented in the current Bitcoin Core client version 0.12 [released in February 2016] and later) is the 'replace-by-fee' (RBF) feature, which is intended to help people 'bump' stuck transactions that have insufficient fees. RBF mining clients will replace any transaction in their mempool with another spending the same UTXO but which include a higher miner fee. This makes the standard double-spend attack much easier: the customer now only needs to broadcast a second transaction with a higher fee, which will displace the original retailer payment transaction in the mempool of miners even if it was received first. In this case, anyone monitoring the network can observe both transactions, extract the private key, and make their own transaction spending the entire FR-P2PK output offering a higher fee. This results in a so-called 'scorched earth' scenario, where any number of observers can front-run the fee, which will then tend to 100% of the output value.

In summary, the possible outcomes of a double-spend attack of a FR-P2PK output are:
1. Initial retailer transaction confirmed first
2. Attack transaction confirmed first
3. Miner transaction confirmed first If miners are both 'honest' and run a 'seen first' client rule, 1 and 2 have similar likelihoods, depending on the timing of the attack and the network topology. If miners act according to economic incentives, or operate a RBF client rule, then the end result is always that a miner will claim the full FR-P2PK output, and the retailer has zero chance of compensation.

If the retailer is not able to broadcast the transaction (and to verify that it has been received by the network) then the attack transaction will of course confirm first. The retailer can then obtain the private key from the signature they possess and signature on the blockchain—but this will be of no use once the funds have been spent.

Sigma Protocols

One technical solution described in this specification (next section) utilises a sigma ($\Sigma$) protocol—which is a type of interactive zero-knowledge proof system, that involves a number of messages between the prover and verifier. $\Sigma$ protocols typically involve 3 moves: the prover sends an initial commitment to the verifier (a), the verifier then responds with a random challenge (x) and then the prover answers with a final response (z). The verifier then accepts or rejects the statement based on the transcript (a,x,z).

$\Sigma$ protocols are used to prove knowledge of, or statements about, a witness (w) that is known only to the prover [Damgard 2010]. The protocol is zero-knowledge if it does not reveal any information about the witness to the verifier, except for the fact that a statement related to the witness is true [Bootle 2015]. The protocol described in the next section is derived from the basic Schnorr protocol for proving knowledge of a discrete logarithm [Schnorr 1990] and the sigma protocol for proving the equivalence of the discrete logarithms [Bootle 2015] of two group elements, employing a one-way function with homomorphic properties (in an embodiment, this can be elliptic curve point multiplication).

An interactive $\Sigma$ protocol can be converted to a non-interactive scheme by applying the Fiat-Shamir heuristic [Fiat 1986]: this simply replaces the random challenge value (x) with the output of a hash of the commitment made by the prover. In the random oracle model (where the output of a cryptographic hash function is considered truly random), the prover cannot cheat, and the verifier can check the validity of the challenge value generated.

Technical Solution

The following sections describe a technical solution in more detail to enable the proposed scheme. The sections following this then describes how this innovation is employed in a complete scheme to overcome the shortcomings of the FR-P2PK method previously described.

In essence, the 'complete scheme' provides a method that enables one party (and one party only) to derive a valid private key (corresponding to a known public key) when a second private key (corresponding to a second known public key) is publically revealed. In order for this method to be secure and trustless, the first party must be provided with a unique piece of information (which we call a compensation key) along with a cryptographic proof that this piece of information will enable them to derive the valid private key when combined with the revealed private key. This proof is based on a zero-knowledge $\Sigma$ protocol, converted into a non-interactive proof through application of the Fiat-Shamir heuristic.

Two parties (or two network nodes) are involved in the protocol: The prover (P—party 1) and the verifier (V—party 2). Both P and V agree on an asymmetric cryptographic function and specification. In general this will consist of a group $\mathbb{G}$ of order n with a generator G, in which the discrete logarithm problem is assumed to be intractable. In a configuration compatible with the Bitcoin protocol, this specification can be the secp256k1 elliptic curve [SEC 2010], which includes the base generator point G (of order n). We denote point multiplication on the elliptic curve with the × symbol. Each party employs cryptographically secure pseudo random number generators (CSPRNG) with an adequate source of entropy. Both parties agree on a cryptographic hash function H (e.g. SHA-256), Initial Set-Up The prover initially generates two secure random private keys:

$$sk_1 \leftarrow \mathbb{Z}_n$$

$$sk_2 \leftarrow \mathbb{Z}_n$$

The prover then computes the corresponding public keys:

$$PK_1 = sk_1 \times G$$

$$PK_2 = sk_2 \times G$$

In one configuration, these can then be used as addresses on the Bitcoin blockchain that are used to control digital assets (as described in the next section).

Protocol

One aim is for the prover to enable the verifier (by securely sending them a key ck) to have the ability to compute $sk_2$ in the event that $sk_1$ is revealed, and for the verifier to authenticate (verify) that they have this ability (given the key ck and the public keys). This is achieved as follows:
1. The prover computes the value:

$$ck = sk_2 \cdot sk_1^{-1} \bmod n$$

2. The prover computes a compact non-interactive zero knowledge proof for the following statement (S): "Given the value ck and the public keys $PK_1$ and $PK_2$, the private key for $PK_2$ is equal to the private key for $PK_1$ multiplied by ck" as follows:
   i. Generate secure random number $r \leftarrow \mathbb{Z}_n$
   ii. Compute the commitment $R = r \times G$. $R_x$ is the x-coordinate of the point R.
   iii. Compute the hash $H(R_x)$. Set x as the left-most $l_n$ bits of H(R) where $l_n$ is the bit length of n. Note, x is the 'challenge' value in a sigma protocol, produced by the verifier. Here it is generated using the Fiat-Shamir heuristic, in the random oracle model using H. This results in a non-interactive proof.
   iv. Compute $z = sk_1 x + r$
   v. The proof is the tuple $\pi = (ck, R, x, z)$
3. The prover establishes a secure communication channel with the verifier and sends them the tuple π along with the public keys $PK_1$ and $PK_2$. In a retail setting this could be achieved with near-field-communication (NFC) devices in close physical proximity. In an on-line setting, this would be achieved with a public key cryptosystem or via a Diffie-Hellman key exchange.
4. The verifier authenticates the tuple π and therefore the truth of the statement S as follows:
   i. Compute $C = ck \times G$
   ii. Verify that:

$$x = \text{left-most of } l_n H(R_x)$$

$$z \times G = x \times PK_1 + R$$

$$z \times C = x \times PK_2 + ck \times R$$

iii. If confirmed, then accept the value ck as valid.

Now, if/when the private key ($sk_1$) corresponding to the public key ($PK_1$) is revealed (for example, as a result of double spending a FR-P2PK output) the verifier can determine the value of $sk_2$:

$$sk_2 = ck \cdot sk_1$$

Performance

A prototype implementation of the protocol has been developed in Python, employing the Bitcoin elliptic curve specification (secp256k1) and the pybitcointools library. The speed performance of each step of the protocol in this implementation was tested on an Intel Core i7 laptop, the results are shown in the Table below (averaged over 10 runs).

| Stage | Average time |
| --- | --- |
| Key generation (set-up) | 14.35 ms |
| Proof generation | 5.71 ms |
| Proof Verification | 30.43 ms |

Zero-Confirmation Protection Instant Payment Scheme

The method as described above can be employed in a larger scheme that enables instant trustless zero-confirmation payments to be made at point-of-sale, with protections for the retailer against double-spend attacks that overcomes the significant shortcomings of the existing FR-P2PK, one-time-signature scheme.

In a nutshell, the scheme relies on a 'spender' or customer sending funds to a FR-P2PK output, as well as a 'deposit' amount to a time-locked output, from the same transaction—in advance of wanting to perform an 'instant' POS purchase. When a purchase is then made, the customer signs a transaction spending from the FR-P2PK output paying to a retailer address, and sends this signed transaction to the retailer along with a compensation key and corresponding validity proof for claiming the parallel time-locked output if the FR-P2PK key is revealed from a double spending attempt. If a double-spend attempt is made (even if it is successful), the retailer can then claim the time-locked output funds after the lock-time. If no double-spend attempt is made, the customer can re-claim the time-locked output.

Note that in this case the retailer does not need to be online or monitor the propagation of their transaction through the network to allow a purchase to proceed: even if a double spend attack transaction is confirmed first, they can still claim compensation.

Set-Up Transaction

The scheme requires the customer to perform a set-up transaction in advance of the instant purchase, which involves funding both a FR-P2PK output (to cover the expected purchase amount) and a deposit output, which is time-locked for the period in which the instant purchase can be made. The amount locked-up in the deposit output will depend on the requirements of the retailer—they may demand a deposit amount that is equal to or greater than the purchase price in order to proceed with a purchase. They may also require a minimum remaining time on the locked deposit (if they are off-line)—the lock time (T) will then be decided upon by the customer based on their spending plans and personal cash-flow. For example, an individual may be planning on making a large purchase over the weekend, so they would lock the deposit funds for 48 hours (or their wallet would do this automatically based on their spending habits).

The finding transaction ($Tx_0$) would then contain two outputs with the following locking conditions:

Spending output:
  Amount: S
  Pay to $PK_S$ with fixed r-value signature (FR-P2PK)
Deposit output:
  Amount: D
  Pay to $PK_D$ after time T (with OP_CHECKLOCKTIMEVERIFY)

The corresponding full Bitcoin transactions scripts are shown in a later section.

At the time of the creation of the set-up transaction the customers instant-spend wallet securely stores the value of $k_S$ used to generate the PK FR-P2PK, the secret key $sk_S$ (corresponding to public key $PR_S$) and $sk_D$ (corresponding to public key $PK_D$). This can be implemented as a smartphone app, which communicates with the retailer via QR codes or NFC radio. The wallet would also compute the compensation key ck and the corresponding proof $\pi=(ck,R,x,z)$ that $sk_D=ck \cdot sk_S$ and store these values securely.

Point-Of-Sale Transaction

The customer then makes purchase with a retailer, before the time T. Neither the customer or the retailer need to be on-line at the time of the purchase, but the retailer must have a recent copy of the UTXO set (that contains the set-up transaction) and be able to broadcast and have the POS transaction confirmed before the time T.

The transaction then proceeds as follows, with the communication between the customer and retailer occurring via NFC radio (i.e. the customer's smart-phone running the wallet app and the retailer's card reader) or some other secure communication channel.

1. The retailer's device sends the payment address (public key hash) and the payment amount to the customer.
2. The customer's app would display the amount and require confirmation (possibly after entering an authorising PIN code).
3. The customer app then constructs a standard Bitcoin transaction $Tx_R$ that spends the FR-P2PK output of the set-up transaction ($Tx_0$) and pays the payment amount to the retailer's address (and the change back to an address generated by the app).
4. The customer app then signs $Tx_R$ with the private key $sk_S$ and using the committed ephemeral key $k_S$.
5. The customer's app then sends the signed $Tx_R$, $PK_S$, $PK_D$, ck and $\pi$ to the retailer's device.
6. The retailer's device then performs the following checks:
   i. $Tx_R$ is valid (correct amounts and addresses)
   ii. $Tx_R$ is correctly signed with $PK_S$
   iii. The UTXO for $PK_S$ contains at least the purchase amount.
   iv. The UTXO for $PK_D$ contains the required deposit (according to the retailers policies).
   v. The time-lock T for the UTXO for $PK_D$ contains the required delay.
   vi. The proof $\pi$ validates the compensation key ck (step 4 is section 4.2).
7. The transaction completes and the purchase is authorised.

Transaction Completion

The retailer then broadcasts the $Tx_R$ transaction to the Bitcoin network in advance of the time T (allowing for the confirmation time). After the time T, the customer can then spend the deposit output to a new address.

Double-Spend Attack

A double-spend attempt occurs if the customer broadcasts a second attack transaction $Tx_A$ at any point (either before or after the POS purchase) that spends the FR-P2PK output. If the retailer has yet to broadcast $Tx_R$, then $Tx_A$ will be confirmed on the blockchain first. If $Tx_R$ and $Tx_A$ are broadcast at the same time, then the private key $sk_S$ can be calculated from the two signatures, and miners may front run their own transaction for inclusion in a block. If the attack transaction is broadcast after $Tx_R$ is confirmed (due to a botched attack) the retailer can also claim the deposit (as well as receiving the purchase price). Either way, if the retailer observes a conflicting transaction either in the mempool or confirmed in the blockchain, before time T, they can calculate $sk_S$ from the $Tx_R$ and $Tx_A$ signatures.

The retailer can then calculate:

$$sk_D \cdot ck \cdot sk_S$$

They then construct a transaction spending the deposit output to an address they control, and sign this transaction with the $sk_D$ key. This transaction is then broadcast to the network immediately after the lock-time T expires. The customer also knows the key $sk_D$ (or can obtain it from their wallet app) and may attempt to spend the deposit output at the same time. This would lead to a strictly 50-50 chance of the retailer or customer transaction being confirmed first in a clear race (no other party can obtain $sk_D$ and front run the transaction). This is significantly better for the retailer than the previous scheme, but the retailer may wish to require a higher (double) deposit amount to counter this risk (so that on average they can never lose money on a transaction).

Advantages

The presented scheme offers a way for one party to pay any other party with a bitcoin transaction instantly and off-line, without requiring either the transaction to be broadcast to the network or any block confirmations, all while being protected from losses due to a double spend transaction. No payment channels are required between the two parties, and the payee need only verify a simple proof to accept the payment with confidence.

The scheme has some downsides: firstly, a deposit amount is required to be locked for a length of time by the payer— which temporarily reduces the customer's available funds and liquidity. In addition, the payer is required to perform an additional on-chain transaction to set-up the system, and this transaction is relatively large in size (due to the signature masks). Also, the instant off-line transaction must be set-up in advance—although this could be automated by wallet applications, and in anticipation of significant purchases.

It is however a substantial improvement over the state-of-the-art no other system has been proposed that enables instant and off-line payments that can eliminate the aggregated risk of loss to a payee without relying on trusted hardware modules or a trusted third party.

Core Protocol Security Proofs

Here we provide a justification for the proof of key validity part of the protocol, in that it satisfies the required properties of a zero-knowledge proof system.

A proof system is said to be complete if the verifier will always be convinced by the prover that a statement is true, if it is indeed true.

This can be demonstrated as follows:

$z = sk_1 x + r$, therefore $z \times G = x \times (sk_1 \times G) + r \times G = x \times PK_1 + R$ Since $R = r \times G$ and $PK_1 \times G$ Also, $z \times C = x \times (sk_1 \cdot ck \times G) + x \times (r \times C) = x PK_2 + ck \times R$ Since $sk_2 = ck \cdot sk_1$ A proof system is said to be sound if it is impossible for the prover to convince the verifier of a statement that is not true. The system is statistically sound if a cheating prover will fail to convince the verifier that a false statement is true with overwhelming probability.

To demonstrate statistical soundness, we consider two valid π tuples (valid in that the verifier accepts them), generated using the same keys and blinding (r) values, but with different challenge (x) values (for this proof, we assume the random challenges are generated independently of r which is sound based on the random oracle model of Fiat-Shamir):

$\pi_1 = (ck, R, x_1, z_1)$ $\pi_2 (ck, R, x_2 z_2)$

We aim to show that it is possible to extract the witness i.e. the secret keys) from the pair of tuples—therefore the witness must exist, given two separate challenges. Therefore, if a single challenge leads to verification, the probability that the prover could answer correctly without knowing the statement being true is 1/n (where n is the number of possible challenges: i.e. the order of G).

Subtracting $z_1 \times G = x_1 \times PK_1 + R$ by $z_2 \times G = x_2 \times PK_1 + R$ we obtain:

$(z_1 - z_2) \times G = (x_1 - x_2) \times PK_1$

Therefore:

$$sk_1 = \frac{z_1 - z_2}{x_1 - x_2}$$

Also, subtracting $z_1 \times C = x_1 \times PK_2 + ck \times R$ by $z_2 \times C = x_2 \times PK_2 + ck \times R$ we obtain:

$(z_1 - z_2) \times C = (x_1 - x_2) \times PK_2$

Therefore:

$$sk_2 = ck \cdot \frac{z_1 - z_2}{x_1 - x_2}$$

This shows that the values $sk_1$ and $sk_2$ can be computed from the pair of tuples, and that the proof satisfies statistical soundness.

A proof-system is said to be zero-knowledge if the transcripts of the protocol (i.e. the communications) can be simulated and leak no information (specifically the witness $sk_1$ and $sk_2$). This can be done under the assumption of Special-Honest Verifier Zero Knowledge (SHVZK), that the challenge x is honestly randomly generated by the verifier.

The aim is to demonstrate the existence of a simulator (S) that given a random challenge can produce a transcript that is indistinguishable from a real one (created by the prover with knowledge of the witness). The simulator does not know the winless, but has full control over the verifier (and can 're-wind' the interaction—and therefore know the challenge in advance).

The simulation can produce a valid transcript as follows.
1. S takes the challenge value x as an input
2. S selects a random value z
3. S computes:

$R = z \times G - x \times PK_1$

The resulting tuple $\pi = (ck, R, x, z)$ is valid according to the checks:

$z \times G = x \times PK_1 + (z \times G - x \times PK_1)$ $z \times C = x \times PK_2 + ck \times (z \times G - x \times PK_1)$ So:

$z \times ck \times G = x \times ck \times PK_1 + ck \times z \times G - ck \times x \times PK_1$ The assumption of an honest verifier can be removed by the use of Fiat-Shamir and by replacing the challenge value with the output from a hash function.

Set-Up Transaction

FIG. 5 shows an example of the form of the set-up transaction $Tx_0$. The output scripts are pay to public keys in this example, but they can be easily modified to pay to addresses (public key hashes) and require the public key on the stack. The transaction can also be constructed as a pay-to-script-hash (P2SH) with the two output scripts supplied as redeem scripts (if isStandard( ) rules are enforced).

Computing Environment

Figure 4:
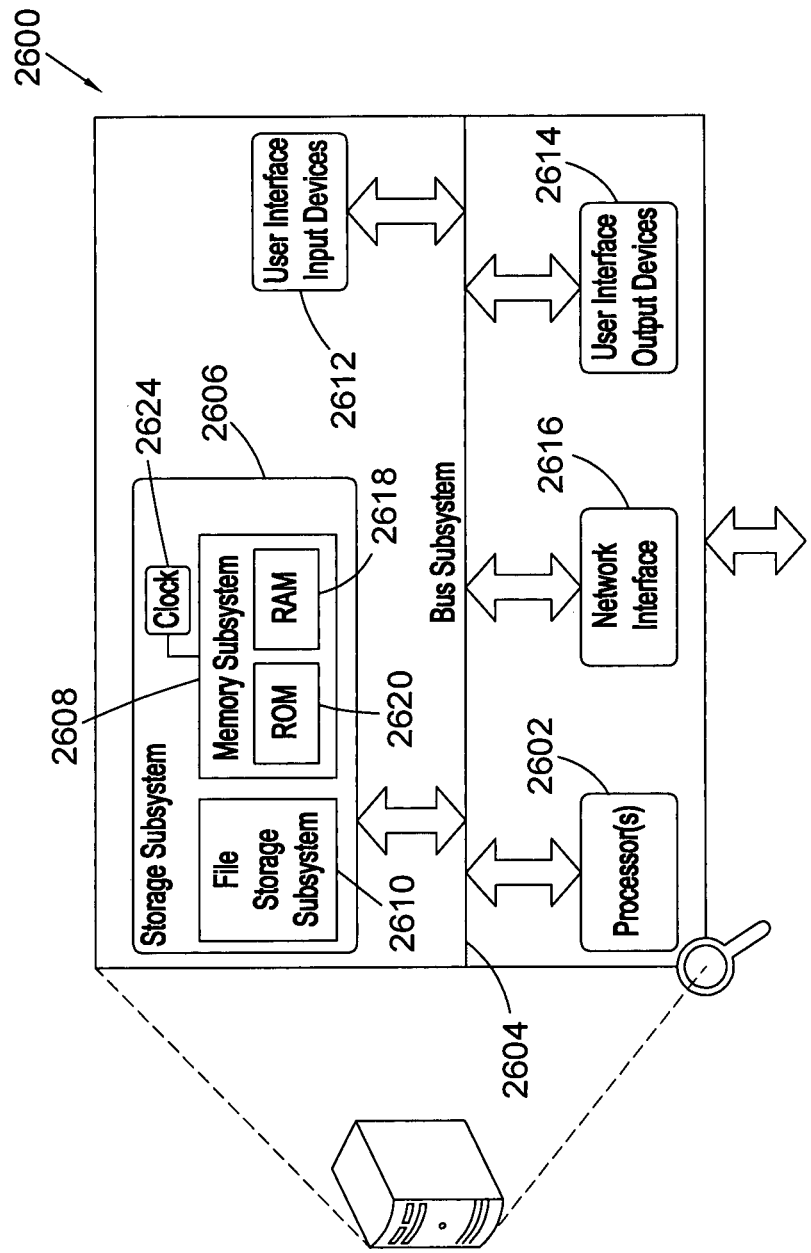
FIG. 4 is a schematic diagram illustrates a computing environment in which various embodiments can be implemented.

FIG. 4 is a schematic diagram illustrates a computing environment in which various embodiments can be implemented. There is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 4, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices.

In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 4 is intended only as a specific example for purposes of illustrating the preferred embodiment of the device. Many other configurations having more or fewer components than the system depicted in FIG. 4 are possible.

Scope

It should be noted that the above-mentioned embodiments illustrate rather than limit the invention, and that those skilled in the art will be capable of designing many alternative embodiments without departing from the scope of the invention as defined by the appended claims.

In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain features are recited in mutually different dependent claims does not indicate that a combination of these measures cannot be used to advantage.

REFERENCES

[Pérez-Solà 2017]: Pérez-Solà, Cristina, et al. "Double-spending Prevention for Bitcoin zero-confirmation transactions." IACR Ctyptology ePrint Archive 2017 (2017): 394.
[Damgard 2010]; Damgard, Ivan. "On Σ-protocols, 2010. url: www.cs.au.dk/ivan." Sigma. pdf.
[Lindell 2015]: Lindell, Yehuda. "An Efficient Transform from Sigma Protocols to NIZK with a CRS and Non-Programmable Random Oracle." TCC (1). 2015.
[Fiat 1986]: Amos Fiat and Adi Shamir: How to Prove Yourself Practical Solutions to Identification and Signature Problems. CRYPTO 1986: pp. 186-194
[Bootle 2015]; Bootle, Jonathan, et al. "Efficient zero-knowledge proof systems." Foundations of Security Analysis and Design VIII. Springer, Cham, 2015. 1-31.
[Schnorr 1990]; C P Schnorr, Efficient identification and signatures for smart cards, in G Brassard, ed. Advances in Cryptology—Crypto '89, 239-252, Springer-Verlag, 1990. Lecture Notes in Computer Science, nr 435
[SEC 2010]; Standards for Efficient Cryptography (SEC) (Certicom Research, http://www.secg.org/sec2-v2.pd

The invention claimed is:

1. A computer-implemented method for a prover to implement a cryptographic protocol, the computer-implemented method comprising:
generating a first cryptographic key pair comprising a first public key ($PK_1$) and a first private key ($sk_1$);
generating a second cryptographic key pair comprising a second public key ($PK_2$) and a second private key ($sk_2$);
constructing a compensation key (ck) from the first and second private keys ($sk_1$; $sk_2$), the compensation key (ck) enabling the second private key ($sk_2$) to be computed in an event that the first private key ($sk_1$) is revealed;

constructing a cryptographic proof that the compensation key (ck) enables the second private key (sk$_2$) to be computed in the event that the first private key (sk$_1$) is revealed, the cryptographic proof not requiring the first and second private keys (sk$_1$; sk$_2$) to be revealed; and sending the first and second public keys (PK$_1$; PK$_2$), the compensation key (ck), and the cryptographic proof to a verifier in order for the verifier to authenticate the cryptographic proof that the compensation key (ck) enables the second private key (sk$_2$) to be computed in the event that the first private key (sk$_1$) is revealed;

wherein the compensation key is calculated by:

$$ck = sk_2 \cdot sk_1^{-1} \bmod n$$

where ck is the compensation key, sk$_1$ is the first private key, sk$_2$ is the second private key, and n is an order of an elliptic curve generator point G used to generate the first and second public keys from the first and second private keys, generation of the first and second public keys including an elliptic curve point multiplication of the elliptic curve generator point G; and wherein the cryptographic proof is constructed by:
generating a secure random number r;
computing a commitment R=r×G, R$_x$ being an x-coordinate of a point R;
computing a hash H(R$_x$), set x being left-most l$_n$ bits of H(R) where l$_n$ is a bit length of n; and
computing z=sk$_1$x+r;
where the cryptographic proof is a tuple π=(ck,R,x,z).

2. The computer-implemented method for a verifier to implement a cryptographic protocol, the computer-implemented method comprising:

receiving, from the prover, the first and second public keys (PK$_1$; PK$_2$), the compensation key (ck), and the cryptographic proof constructed using the computer-implemented method according to claim 1; and checking that the cryptographic proof validates the compensation key (ck) such that the second private key (sk$_2$) can be computed in the event that the first private key (sk$_1$) is revealed;

whereby, in response to disclosure of information revealing the first private key (sk$_1$), the verifier:
calculates the second private key (sk$_2$) from the first private key (sk$_1$) and the compensation key (ck); and
utilizes the second private key (sk$_2$) to access cryptographic assets associated with the second public key (PK$_2$).

3. The computer-implemented method according to claim 1,
wherein cryptographic assets associated with the second public key (PK$_2$) are time-locked for a lock-time T whereby the cryptographic assets can only be accessed after the lock-time T expires.

4. The computer-implemented method according to claim 1,
wherein the cryptographic proof is a non-interactive zero knowledge proof.

5. The computer-implemented method according to claim 4,
wherein the non-interactive zero knowledge proof is based on a zero-knowledge sigma (Σ) protocol converted to a non-interactive zero knowledge proof through application of a Fiat-Shamir heuristic.

6. The computer-implemented method according to claim 1,
wherein the verifier authenticates the tuple as follows: computing $$C = ck \times G$$

verifying that:

$$x = \text{left-most of } l_n H(R_x)$$

$$z \times G = x \times PK_1 + R$$

$$z \times C = x \times PK_2 + ck \times R$$

in response to confirmation, then accept value ck as valid.

7. The computer-implemented method according to claim 1, wherein the prover:
constructs a funding transaction comprising: a spend output associated with the first public key (PK$_1$) and the first private key (sk$_1$); and a deposit output associated with the second public key (PK$_2$) and the second private key (sk$_2$), the deposit output being time-locked for a lock-time T;
broadcasts the funding transaction to a blockchain network for incorporation in a blockchain;
constructs a purchase transaction to transfer funds from the spend output of the funding transaction to a payment address of the verifier over the blockchain network, the purchase transaction being signed using the first private key (sk$_1$); and
sends the purchase transaction, the first and second public keys (PK$_1$; PK$_2$), the compensation key (ck), and the cryptographic proof to the verifier.

8. The computer-implemented method according to claim 7, wherein the verifier:
receives, from the prover, the purchase transaction, the first and second public keys (PK$_1$; PK$_2$), the compensation key (ck), and the cryptographic proof;
checks that the purchase transaction correctly specifies the funds to be transferred from the spend output associated with the first public key (PK$_1$) to the payment address;
checks that the deposit output associated with the second public key (PK$_2$) contains a required deposit amount;
checks that the cryptographic proof validates the compensation key (ck) such that the second private key (sk$_2$) can be computed in the event that the first private key (sk$_1$) is revealed; and
authorizes the purchase transaction and broadcasts the purchase transaction to the blockchain network,
whereby as a result of a second competing purchase transaction being broadcasted to the blockchain network to spend funds from the spend output of the funding transaction prior to the lock-time T expiring, the verifier:
calculates the first private key (sk$_1$) from signatures of the purchase transaction and second purchase transaction;
calculates the second private key (sk$_2$) from the first private key (sk$_1$) and the compensation key (ck);
constructs a transaction to transfer funds from the deposit output of the funding transaction to an address on the blockchain;
signs the transaction with the second private key (sk$_2$); and broadcasts the transaction to the blockchain network such that the funds in the deposit output of the funding transaction can be obtained by a vendor after the lock-time T expires.

9. The computer-implemented method according to claim 7,
wherein the spend output is configured such that to transfer funds from the spend output requires a transaction signature based on a fixed ephemeral key (k).

10. The computer-implemented method according to claim 9,
wherein the spend output is a fixed-r-pay-to-public-key (FR-P2PK) output such that to transfer funds from the spend output requires a transaction signature utilizing a pre-specified r value.

11. The computer-implemented method according to claim 7,
wherein the deposit output is larger than the spend output.

12. A non-transitory computer-readable storage medium comprising computer-executable instructions which, when executed, configure one or more processors to perform the method of claim 1.

13. An electronic device comprising:
one or more processor(s); and
a memory coupled to the one or more processor(s), the memory having stored thereon computer executable instructions which, when executed, configure the one or more processor(s) to perform the method of claim 1.

14. A node of a blockchain network, the node configured to perform the method of claim 1.

15. A non-transitory computer-readable storage medium comprising computer-executable instructions which, when executed, configure one or more processors to perform the method of claim 2.

16. A non-transitory computer-readable storage medium comprising computer-executable instructions which, when executed, configure one or more processors to perform the method of claim 3.

17. An electronic device comprising:
one or more processor(s); and
a memory coupled to the one or more processor(s), the memory having stored thereon computer executable instructions which, when executed, configure the one or more processor(s) to perform the method of claim 2.

18. An electronic device comprising:
one or more processor(s); and
a memory coupled to the one or more processor(s), the memory having stored thereon computer executable instructions which, when executed, configure the one or more processor(s) to perform the method of claim 3.

* * * * *